US008780752B2

(12) United States Patent
Linsky et al.

(10) Patent No.: US 8,780,752 B2
(45) Date of Patent: *Jul. 15, 2014

(54) METHOD AND APPARATUS TO FACILITATE SUPPORT FOR MULTI-RADIO COEXISTENCE

(75) Inventors: Joel Benjamin Linsky, San Diego, CA (US); Jibing Wang, San Diego, CA (US); John R. Saad, Jr., San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 92 days.

This patent is subject to a terminal disclaimer.

(21) Appl. No.: 13/410,198

(22) Filed: Mar. 1, 2012

(65) Prior Publication Data

US 2013/0064111 A1 Mar. 14, 2013

Related U.S. Application Data

(60) Provisional application No. 61/448,503, filed on Mar. 2, 2011.

(51) Int. Cl.
*H04W 24/04* (2009.01)
*H04W 16/14* (2009.01)
*H04W 88/06* (2009.01)

(52) U.S. Cl.
CPC .............. *H04W 16/14* (2013.01); *H04W 88/06* (2013.01)
USPC ........................... 370/252; 370/254; 370/350

(58) Field of Classification Search
CPC ................. H04W 88/06; H04W 24/02–24/04; H04W 72/04; H04W 72/08–72/10; H04W 16/14–16/16; H04W 28/04–28/048; H04W 72/02

USPC ......... 370/352, 254–255, 280, 329, 336–337, 370/345–350, 436–437, 442–444, 458–459, 370/468, 803; 455/501, 522
See application file for complete search history.

(56) References Cited

U.S. PATENT DOCUMENTS 7,653,397 B2   1/2010   Pernu et al.
7,797,013 B2   9/2010   Skarby et al.
(Continued)

OTHER PUBLICATIONS

3rd Generation Partnership Project; Technical Specification Group Radio Access Networks; Evolved Universal Terrestrial Radio Access (E-UTRA); Study on signaling and procedure for interference avoidance for in-device coexistence; (Release 10), 3GPP Standard; 3GPP TR 36.816, 3rd Generation Partnership Project (3GPP), Mobile Competence Centre ; 650, Route Des Lucioles ; F-06921 Sophia-Antipolis Cedex ; France, No. v1.0.0, Dec. 17, 2010, pp. 1-34, XP050462125, [retrieved on Dec. 17, 2010].
International Search Report and Written Opinion—PCT/US2012/027500—ISA/EPO—Jul. 27, 2012.

(Continued)

*Primary Examiner* — Dang Ton
*Assistant Examiner* — Mewale Ambaye
(74) *Attorney, Agent, or Firm* — Seyfarth Shaw LLP

(57) ABSTRACT

In a multi-radio user equipment, a power backoff or similar restraint may be placed on communications of a first radio, such as LTE, in order to protect operations of a second radio, such as Bluetooth, depending on the time remaining for completion of the communications of the second radio. Such protected operations may include paging or inquiry operations. A power backoff may be applied to an LTE radio in order to protect completion of the paging or inquiry operations. The power backoff may be increased as the time to completion of the paging or inquiry operations approaches.

20 Claims, 10 Drawing Sheets

(56) References Cited

U.S. PATENT DOCUMENTS

| | | |
|---|---|---|
| 2007/0206631 A1 | 9/2007 | Parts et al. |
| 2008/0144493 A1* | 6/2008 | Yeh ............................. 370/230 |
| 2009/0040937 A1 | 2/2009 | Xhafa et al. |
| 2009/0257379 A1 | 10/2009 | Robinson et al. |
| 2009/0325625 A1* | 12/2009 | Hugl et al. .................... 455/522 |
| 2010/0197235 A1* | 8/2010 | Wilhelmsson ............... 455/63.3 |
| 2010/0304685 A1* | 12/2010 | Wietfeldt et al. .......... 455/67.11 |
| 2010/0329231 A1 | 12/2010 | Sekiya et al. |
| 2011/0009060 A1 | 1/2011 | Hsu et al. |
| 2011/0009136 A1* | 1/2011 | Mantravadi et al. .......... 455/501 |
| 2012/0164948 A1* | 6/2012 | Narasimha et al. .......... 455/63.1 |

OTHER PUBLICATIONS

Motorola Mobility: "Triggering of In-device Coexistence procedures", 3GPP Draft; R2-115370-Triggering of Indevice Coexistence Procedures, 3rd Generation Partnership Project (3GPP), Mobile Competence Centre ; 650, Route Des Lucioles ; F-06921 Sophia-Anti Polis Cedex; France, vol. RAN WG2, No. Zhuhai; 20111010, Oct. 4, 2011, XP050541044, [retrieved on Oct. 4, 2011] paragraph [02.2].

Motorola: "PHR and P_CMAX Reporting", 3GPP Draft; R2-106478-PHR PCMAX, 3rd Generation Partnershpipro Ject (3GPP), Mobile Competence Centre ; 650, Route Des Lucioles ; F-06921 Sophia-Anti Poli S Cedex; France, vol. RAN WG2, No. Jacksonville USA; 20101115, Nov. 9, 2010, XP050492294, [retrieved on Nov. 9, 2010] paragraph [02.1].

* cited by examiner

METHOD AND APPARATUS TO FACILITATE SUPPORT FOR MULTI-RADIO COEXISTENCE

CROSS REFERENCE TO RELATED APPLICATION

This application claims the benefit of U.S. provisional patent application No. 61/448,503 filed Mar. 2, 2011, in the names of LINSKY et al., the disclosure of which is expressly incorporated by reference in its entirety.

TECHNICAL FIELD

The present description is related, generally, to multi-radio techniques and, more specifically, to coexistence techniques for multi-radio devices.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple out (MIMO) system.

Some conventional advanced devices include multiple radios for transmitting/receiving using different Radio Access Technologies (RATs). Examples of RATs include, e.g., Universal Mobile Telecommunications System (UMTS), Global System for Mobile Communications (GSM), cdma2000, WiMAX, WLAN (e.g., WiFi), Bluetooth, LTE, and the like.

An example mobile device includes an LTE User Equipment (UE), such as a fourth generation (4G) mobile phone. Such 4G phone may include various radios to provide a variety of functions for the user. For purposes of this example, the 4G phone includes an LTE radio for voice and data, an IEEE 802.11 (WiFi) radio, a Global Positioning System (GPS) radio, and a Bluetooth radio, where two of the above or all four may operate simultaneously. While the different radios provide useful functionalities for the phone, their inclusion in a single device gives rise to coexistence issues. Specifically, operation of one radio may in some cases interfere with operation of another radio through radiative, conductive, resource collision, and/or other interference mechanisms. Coexistence issues include such interference.

This is especially true for the LTE uplink channel, which is adjacent to the Industrial Scientific and Medical (ISM) band and may cause interference therewith. It is noted that Bluetooth and some Wireless LAN (WLAN) channels fall within the ISM band. In some instances, a Bluetooth error rate can become unacceptable when LTE is active in some channels of Band 7 or even Band 40 for some Bluetooth channel conditions. Even though there is no significant degradation to LTE, simultaneous operation with Bluetooth can result in disruption in voice services terminating in a Bluetooth headset. Such disruption may be unacceptable to the consumer. A similar issue exists when LTE transmissions interfere with GPS. Currently, there is no mechanism that can solve this issue since LTE by itself does not experience any degradation With reference specifically to LTE, it is noted that a UE communicates with an evolved NodeB (eNB; e.g., a base station for a wireless communications network) to inform the eNB of interference seen by the UE on the downlink. Furthermore, the eNB may be able to estimate interference at the UE using a downlink error rate. In some instances, the eNB and the UE can cooperate to find a solution that reduces interference at the UE, even interference due to radios within the UE itself. However, in conventional LTE, the interference estimates regarding the downlink may not be adequate to comprehensively address interference.

In one instance, an LTE uplink signal interferes with a Bluetooth signal or WLAN signal. However, such interference is not reflected in the downlink measurement reports at the eNB. As a result, unilateral action on the part of the UE (e.g., moving the uplink signal to a different channel) may be thwarted by the eNB, which is not aware of the uplink coexistence issue and seeks to undo the unilateral action. For instance, even if the UE re-establishes the connection on a different frequency channel, the network can still handover the UE back to the original frequency channel that was corrupted by the in-device interference. This is a likely scenario because the desired signal strength on the corrupted channel may sometimes be higher be reflected in the measurement reports of the new channel based on Reference Signal Received Power (RSRP) to the eNB. Hence, a ping-pong effect of being transferred back and forth between the corrupted channel and the desired channel can happen if the eNB uses RSRP reports to make handover decisions.

Other unilateral action on the part of the UE, such as simply stopping uplink communications without coordination of the eNB may cause power loop malfunctions at the eNB. Additional issues that exist in conventional LTE include a general lack of ability on the part of the UE to suggest desired configurations as an alternative to configurations that have coexistence issues. For at least these reasons, uplink coexistence issues at the UE may remain unresolved for a long time period, degrading performance and efficiency for other radios of the UE.

SUMMARY

According to one aspect of the disclosure, a method of communicating in a wireless network includes determining a time period remaining for an operation by a first radio access technology (RAT). The method may also include applying a power backoff to a second RAT based on the time period remaining.

According to another aspect of the disclosure, an apparatus for communicating in a wireless network includes means for determining a time period remaining for an operation by a first radio access technology (RAT). The apparatus may also include means for applying a power backoff to a second RAT based on the time period remaining.

According to one aspect of the disclosure, an apparatus for communicating in a wireless network includes a memory and at least one processor coupled to the memory. The processor(s) is configured to determine a time period remaining for an operation by a first radio access technology (RAT). The processor(s) is further configured to apply a power backoff to a second RAT based on the time period remaining.

According to another aspect of the disclosure, a computer program product for wireless communications in a wireless network includes a computer-readable medium having non-transitory program code recorded thereon. The program code includes program code to determine a time period remaining for an operation by a first radio access technology (RAT). The program code also includes program code to apply a power backoff to a second RAT based on the time period remaining.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
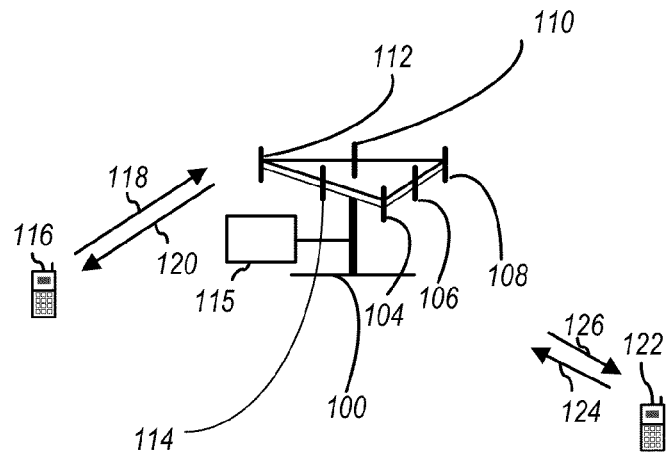
FIG. 1 illustrates a multiple access wireless communication system according to one aspect.

Various aspects of the disclosure provide techniques to mitigate coexistence issues in multi-radio devices, where significant in-device coexistence problems can exist between, e.g., the LTE and Industrial Scientific and Medical (ISM) bands (e.g., for Bluetooth/WLAN). As explained above, some coexistence issues persist because an eNB is not aware of interference on the UE side that is experienced by other radios. According to one aspect, the UE declares a Radio Link Failure (RLF) and autonomously accesses a new channel or Radio Access Technology (RAT) if there is a coexistence issue on the present channel. The UE can declare a RLF in some examples for the following reasons: 1) UE reception is affected by interference due to coexistence, and 2) the UE transmitter is causing disruptive interference to another radio. The UE then sends a message indicating the coexistence issue to the eNB while reestablishing connection in the new channel or RAT. The eNB becomes aware of the coexistence issue by virtue of having received the message.

The techniques described herein can be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network can implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network can implement a radio technology such as Global System for Mobile Communications (GSM). An OFDMA network can implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in portions of the description below.

Single carrier frequency division multiple access (SC-FDMA), which utilizes single carrier modulation and frequency domain equalization is a technique that can be utilized with various aspects described herein. SC-FDMA has similar performance and essentially the same overall complexity as those of an OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for an uplink multiple access scheme in 3GPP Long Term Evolution (LTE), or Evolved UTRA.

Referring to FIG. 1, a multiple access wireless communication system according to one aspect is illustrated. An evolved Node B 100 (eNB) includes a computer 115 that has processing resources and memory resources to manage the LTE communications by allocating resources and parameters, granting/denying requests from user equipment, and/or the like. The eNB 100 also has multiple antenna groups, one group including antenna 104 and antenna 106, another group including antenna 108 and antenna 110, and an additional group including antenna 112 and antenna 114. In FIG. 1, only two antennas are shown for each antenna group, however, more or fewer antennas can be utilized for each antenna group. A User Equipment (UE) 116 (also referred to as an Access Terminal (AT)) is in communication with antennas 112 and 114, while antennas 112 and 114 transmit information to the UE 116 over an uplink (UL) 188. The UE 122 is in communication with antennas 106 and 108, while antennas 106 and 108 transmit information to the UE 122 over a downlink (DL) 126 and receive information from the UE 122 over an uplink 124. In an FDD system, communication links 118, 120, 124 and 126 can use different frequencies for communication. For example, the downlink 120 can use a different frequency than used by the uplink 118.

Each group of antennas and/or the area in which they are designed to communicate is often referred to as a sector of the eNB. In this aspect, respective antenna groups are designed to communicate to UEs in a sector of the areas covered by the eNB 100.

In communication over the downlinks 120 and 126, the transmitting antennas of the eNB 100 utilize beamforming to improve the signal-to-noise ratio of the uplinks for the different UEs 116 and 122. Also, an eNB using beamforming to transmit to UEs scattered randomly through its coverage causes less interference to UEs in neighboring cells than a UE transmitting through a single antenna to all its UEs.

An eNB can be a fixed station used for communicating with the terminals and can also be referred to as an access point, base station, or some other terminology. A UE can also be called an access terminal, a wireless communication device, terminal, or some other terminology.

Figure 2:
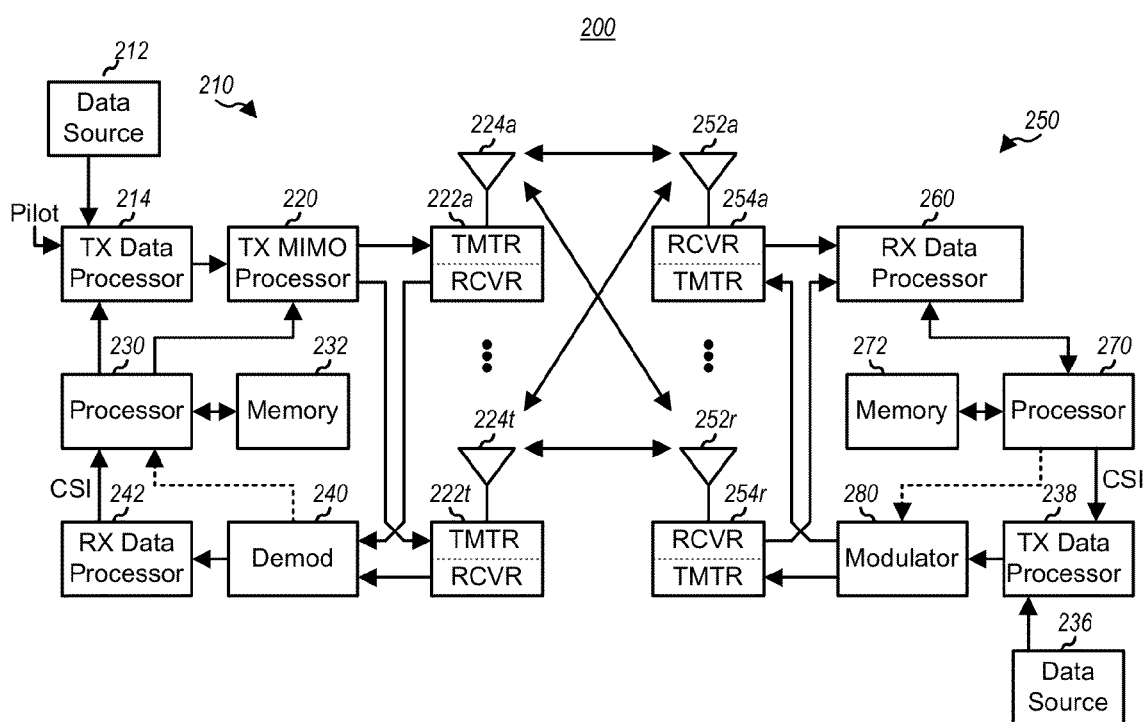
FIG. 2 is a block diagram of a communication system according to one aspect.

FIG. 2 is a block diagram of an aspect of a transmitter system 210 (also known as an eNB) and a receiver system 250 (also known as a UE) in a MIMO system 200. In some instances, both a UE and an eNB each have a transceiver that includes a transmitter system and a receiver system. At the transmitter system 210, traffic data for a number of data streams is provided from a data source 212 to a transmit (TX) data processor 214.

A MIMO system employs multiple (NT) transmit antennas and multiple (NR) receive antennas for data transmission. A MIMO channel formed by the NT transmit and NR receive antennas may be decomposed into NS independent channels, which are also referred to as spatial channels, wherein NS≤min {NT, NR}. Each of the NS independent channels corresponds to a dimension. The MIMO system can provide improved performance (e.g., higher throughput and/or greater reliability) if the additional dimensionalities created by the multiple transmit and receive antennas are utilized.

A MIMO system supports time division duplex (TDD) and frequency division duplex (FDD) systems. In a TDD system, the uplink and downlink transmissions are on the same frequency region so that the reciprocity principle allows the estimation of the downlink channel from the uplink channel. This enables the eNB to extract transmit beamforming gain on the downlink when multiple antennas are available at the eNB.

In an aspect, each data stream is transmitted over a respective transmit antenna. The TX data processor 214 formats, codes, and interleaves the traffic data for each data stream based on a particular coding scheme selected for that data stream to provide coded data.

The coded data for each data stream can be multiplexed with pilot data using OFDM techniques. The pilot data is a known data pattern processed in a known manner and can be used at the receiver system to estimate the channel response. The multiplexed pilot and coded data for each data stream is then modulated (e.g., symbol mapped) based on a particular modulation scheme (e.g., BPSK, QSPK, M-PSK, or M-QAM) selected for that data stream to provide modulation symbols. The data rate, coding, and modulation for each data stream can be determined by instructions performed by a processor 230 operating with a memory 232.

The modulation symbols for respective data streams are then provided to a TX MIMO processor 220, which can further process the modulation symbols (e.g., for OFDM). The TX MIMO processor 220 then provides NT modulation symbol streams to NT transmitters (TMTR) 222*a* through 222*t*. In certain aspects, the TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. NT modulated signals from the transmitters 222*a* through 222*t* are then transmitted from NT antennas 224*a* through 224*t*, respectively.

At a receiver system 250, the transmitted modulated signals are received by NR antennas 252*a* through 252*r* and the received signal from each antenna 252 is provided to a respective receiver (RCVR) 254*a* through 254*r*. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the NR received symbol streams from NR receivers 254 based on a particular receiver processing technique to provide NR "detected" symbol streams. The RX data processor 260 then demodulates, deinterleaves, and decodes each detected symbol stream to recover the traffic data for the data stream. The processing by the RX data processor 260 is complementary to the processing performed by the TX MIMO processor 220 and the TX data processor 214 at the transmitter system 210.

A processor 270 (operating with a memory 272) periodically determines which pre-coding matrix to use (discussed below). The processor 270 formulates an uplink message having a matrix index portion and a rank value portion.

The uplink message can include various types of information regarding the communication link and/or the received data stream. The uplink message is then processed by a TX data processor 238, which also receives traffic data for a number of data streams from a data source 236, modulated by a modulator 280, conditioned by transmitters 254*a* through 254*r*, and transmitted back to the transmitter system 210.

At the transmitter system 210, the modulated signals from the receiver system 250 are received by antennas 224, conditioned by receivers 222, demodulated by a demodulator 240, and processed by an RX data processor 242 to extract the uplink message transmitted by the receiver system 250. The processor 230 then determines which pre-coding matrix to use for determining the beamforming weights, then processes the extracted message.

Figure 3:
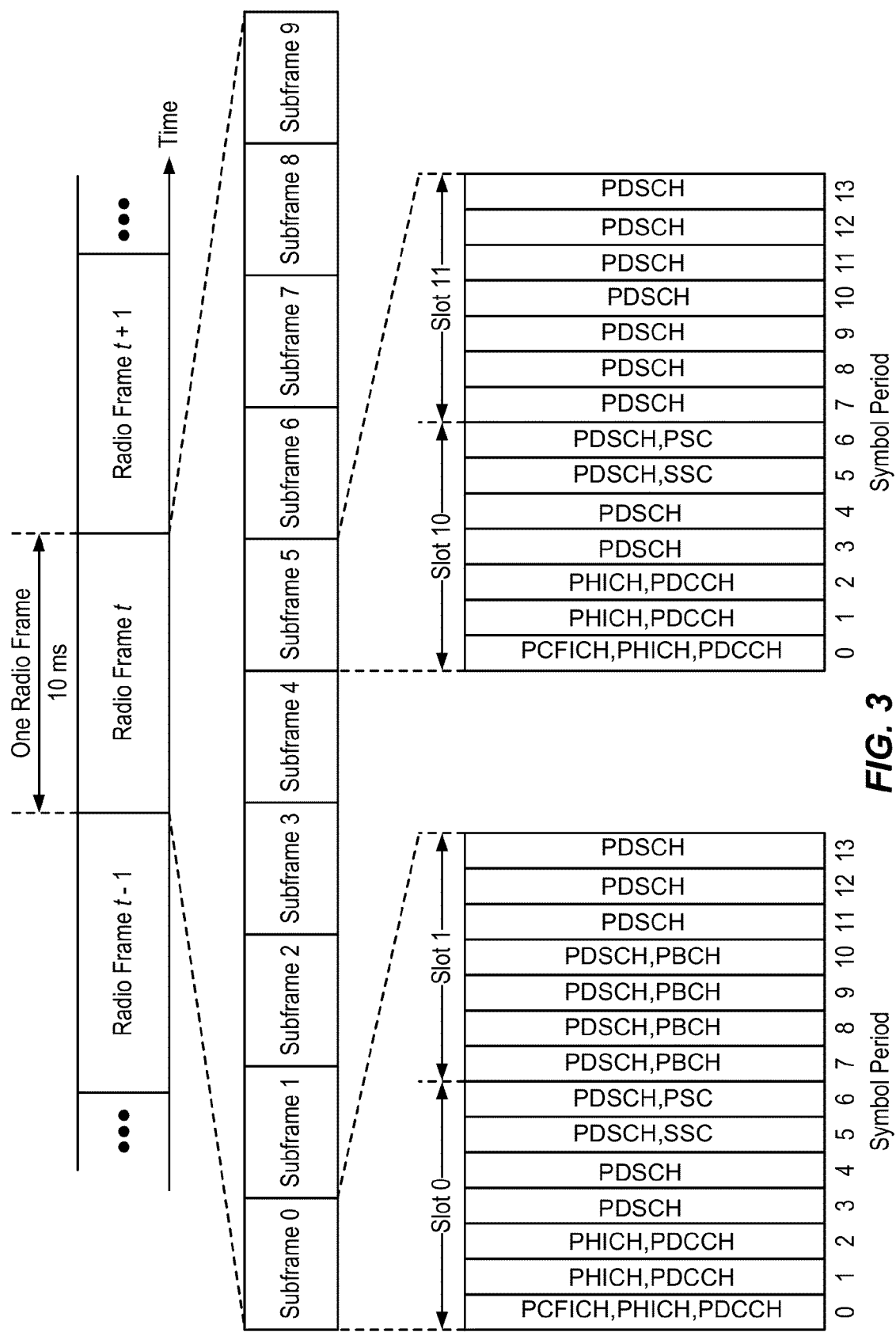
FIG. 3 illustrates an exemplary frame structure in downlink Long Term Evolution (LTE) communications.

FIG. 3 is a block diagram conceptually illustrating an exemplary frame structure in downlink Long Term Evolution (LTE) communications. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 3) or 6 symbol periods for an extended cyclic prefix. The 2L symbol periods in each subframe may be assigned indices of 0 through 2L-1. The available time frequency resources may be partitioned into resource blocks. Each resource block may cover N subcarriers (e.g., 12 subcarriers) in one slot.

In LTE, an eNB may send a Primary Synchronization Signal (PSS) and a Secondary Synchronization Signal (SSS) for each cell in the eNB. The PSS and SSS may be sent in symbol periods 6 and 5, respectively, in each of subframes 0 and 5 of each radio frame with the normal cyclic prefix, as shown in FIG. 3. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Cell-specific Reference Signal (CRS) for each cell in the eNB. The CRS may be sent in symbols 0, 1, and 4 of each slot in case of the normal cyclic prefix, and in symbols 0, 1, and 3 of each slot in case of the extended cyclic prefix. The CRS may be used by UEs for coherent demodulation of physical channels, timing and frequency tracking, Radio Link Monitoring (RLM), Reference Signal Received Power (RSRP), and Reference Signal Received Quality (RSRQ) measurements, etc.

The eNB may send a Physical Control Format Indicator Channel (PCFICH) in the first symbol period of each subframe, as seen in FIG. 3. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 3, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 3. The PHICH may carry information to support Hybrid Automatic Repeat Request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
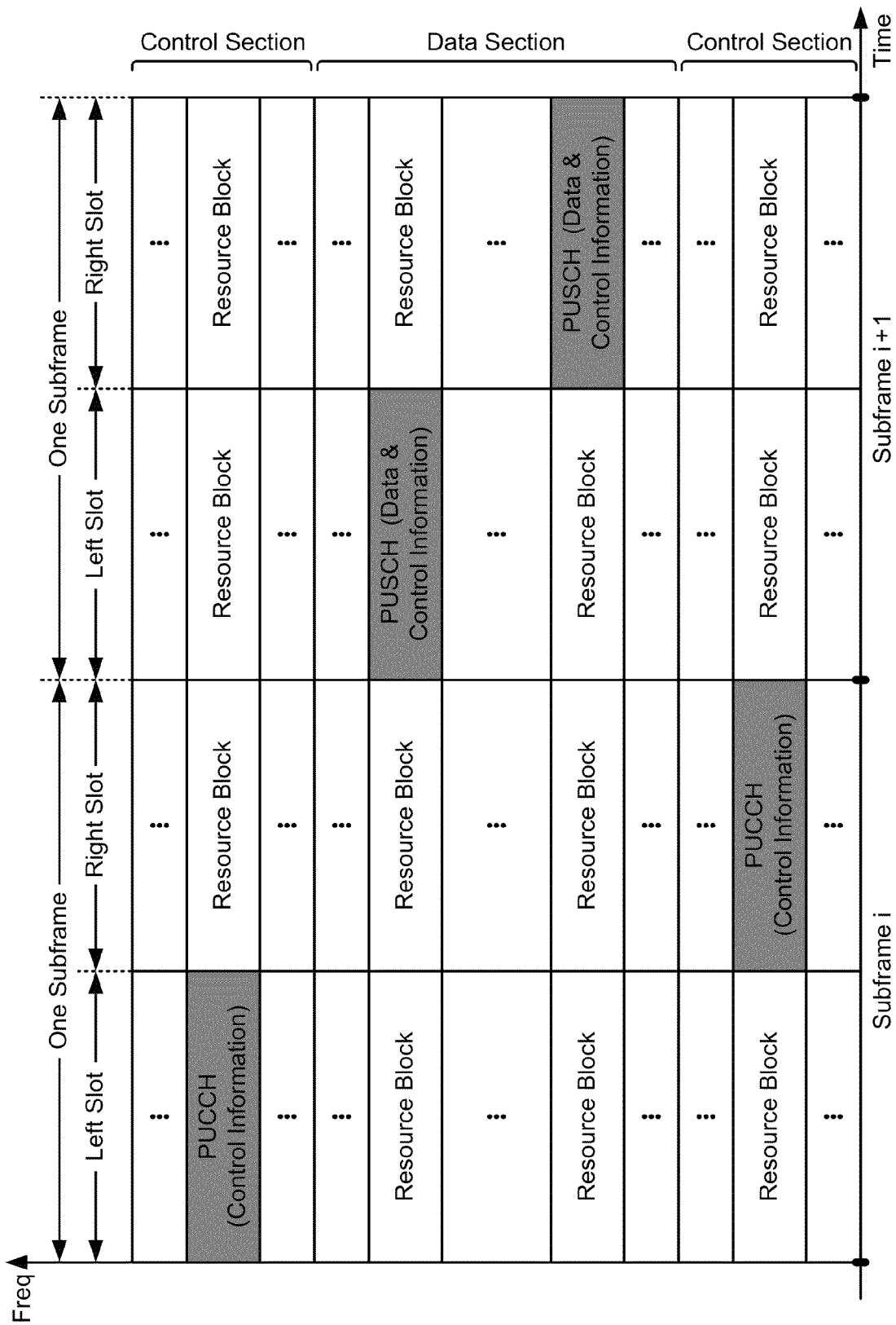
FIG. 4 is a block diagram conceptually illustrating an exemplary frame structure in uplink Long Term Evolution (LTE) communications.

FIG. 4 is a block diagram conceptually illustrating an exemplary frame structure in uplink Long Term Evolution (LTE) communications. The available Resource Blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 4 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNodeB. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 4.

The PSS, SSS, CRS, PBCH, PUCCH and PUSCH in LTE are described in 3GPP TS 36.211, entitled "Evolved Universal Terrestrial Radio Access (E-UTRA); Physical Channels and Modulation," which is publicly available.

In an aspect, described herein are systems and methods for providing support within a wireless communication environment, such as a 3GPP LTE environment or the like, to facilitate multi-radio coexistence solutions.

Figure 5:
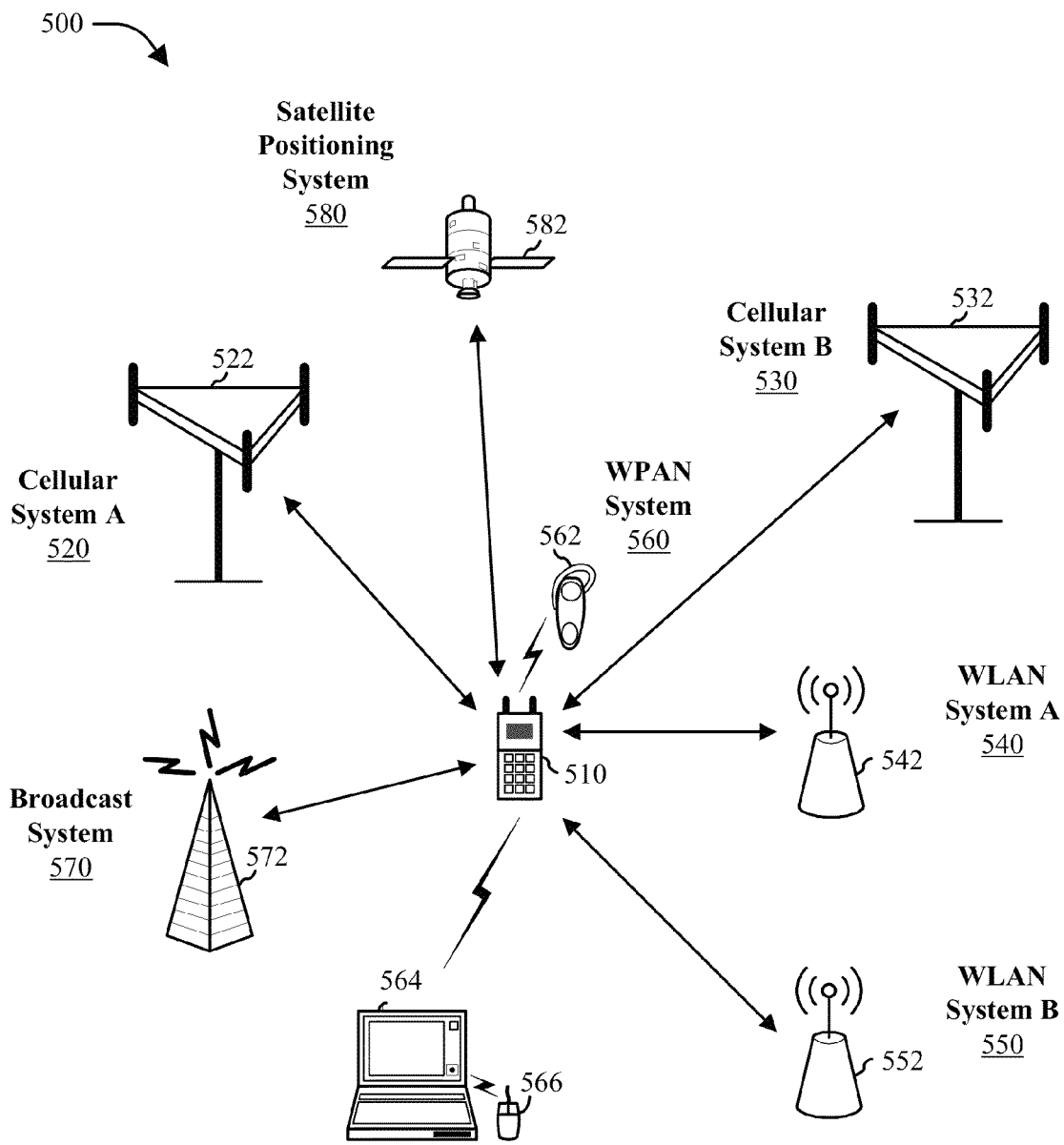
FIG. 5 illustrates an example wireless communication environment.

Referring now to FIG. 5, illustrated is an example wireless communication environment 500 in which various aspects described herein can function. The wireless communication environment 500 can include a wireless device 510, which can be capable of communicating with multiple communication systems. These systems can include, for example, one or more cellular systems 520 and/or 530, one or more WLAN systems 540 and/or 550, one or more wireless personal area network (WPAN) systems 560, one or more broadcast systems 570, one or more satellite positioning systems 580, other systems not shown in FIG. 5, or any combination thereof. It should be appreciated that in the following description the terms "network" and "system" are often used interchangeably.

The cellular systems 520 and 530 can each be a CDMA, TDMA, FDMA, OFDMA, Single Carrier FDMA (SC-FDMA), or other suitable system. A CDMA system can implement a radio technology such as Universal Terrestrial Radio Access (UTRA), cdma2000, etc. UTRA includes Wideband CDMA (WCDMA) and other variants of CDMA. Moreover, cdma2000 covers IS-2000 (CDMA2000 1X), IS-95 and IS-856 (HRPD) standards. A TDMA system can implement a radio technology such as Global System for Mobile Communications (GSM), Digital Advanced Mobile Phone System (D-AMPS), etc. An OFDMA system can implement a radio technology such as Evolved UTRA (E-UTRA), Ultra Mobile Broadband (UMB), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). In an aspect, the cellular system 520 can include a number of base stations 522, which can support bi-directional communication for wireless devices within their coverage. Similarly, the cellular system 530 can include a number of base stations 532 that can support bi-directional communication for wireless devices within their coverage.

WLAN systems 540 and 550 can respectively implement radio technologies such as IEEE 802.11 (WiFi), Hiperlan, etc. The WLAN system 540 can include one or more access points 542 that can support bi-directional communication. Similarly, the WLAN system 550 can include one or more access points 552 that can support bi-directional communication. The WPAN system 560 can implement a radio technology such as Bluetooth (BT), IEEE 802.15, etc. Further, the WPAN system 560 can support bi-directional communication for various devices such as wireless device 510, a headset 562, a computer 564, a mouse 566, or the like.

The broadcast system 570 can be a television (TV) broadcast system, a frequency modulation (FM) broadcast system, a digital broadcast system, etc. A digital broadcast system can implement a radio technology such as MediaFLO™, Digital Video Broadcasting for Handhelds (DVB-H), Integrated Services Digital Broadcasting for Terrestrial Television Broadcasting (ISDB-T), or the like. Further, the broadcast system 570 can include one or more broadcast stations 572 that can support one-way communication.

The satellite positioning system 580 can be the United States Global Positioning System (GPS), the European Galileo system, the Russian GLONASS system, the Quasi-Zenith Satellite System (QZSS) over Japan, the Indian Regional Navigational Satellite System (IRNSS) over India, the Beidou system over China, and/or any other suitable system. Further, the satellite positioning system 580 can include a number of satellites 582 that transmit signals for position determination.

In an aspect, the wireless device 510 can be stationary or mobile and can also be referred to as a user equipment (UE), a mobile station, a mobile equipment, a terminal, an access terminal, a subscriber unit, a station, etc. The wireless device 510 can be cellular phone, a personal digital assistance (PDA), a wireless modem, a handheld device, a laptop computer, a cordless phone, a wireless local loop (WLL) station, etc. In addition, a wireless device 510 can engage in two-way communication with the cellular system 520 and/or 530, the WLAN system 540 and/or 550, devices with the WPAN system 560, and/or any other suitable systems(s) and/or devices(s). The wireless device 510 can additionally or alternatively receive signals from the broadcast system 570 and/or satellite positioning system 580. In general, it can be appreciated that the wireless device 510 can communicate with any number of systems at any given moment. Also, the wireless device 510 may experience coexistence issues among various ones of its constituent radio devices that operate at the same time. Accordingly, device 510 includes a coexistence manager (CxM, not shown) that has a functional module to detect and mitigate coexistence issues, as explained further below.

Figure 6:
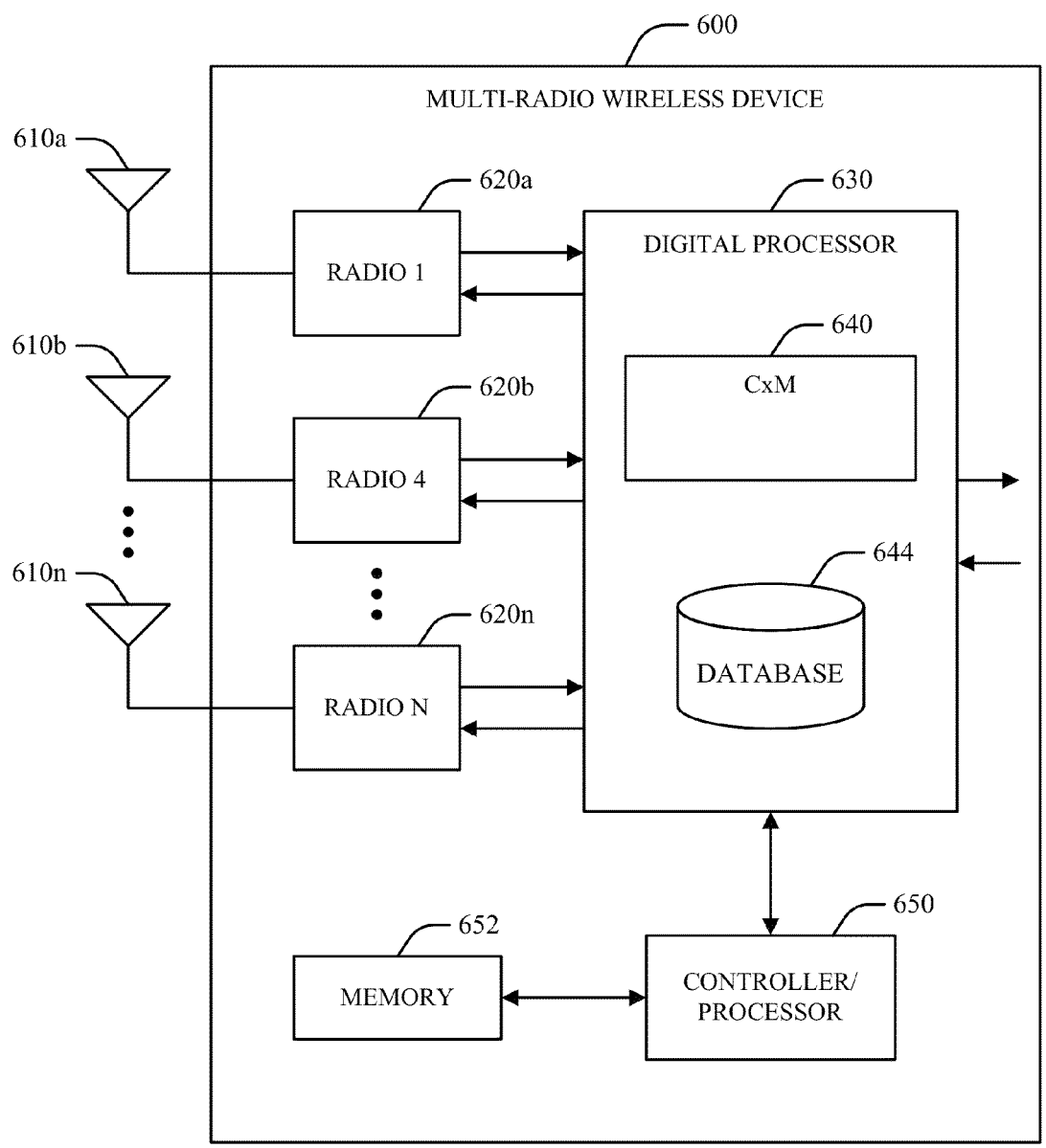
FIG. 6 is a block diagram of an example design for a multi-radio wireless device.

Turning next to FIG. 6, a block diagram is provided that illustrates an example design for a multi-radio wireless device 600 and may be used as an implementation of the radio 510 of FIG. 5. As FIG. 6 illustrates, the wireless device 600 can include N radios 620a through 620n, which can be coupled to N antennas 610a through 610n, respectively, where N can be any integer value. It should be appreciated, however, that respective radios 620 can be coupled to any number of antennas 610 and that multiple radios 620 can also share a given antenna 610.

In general, a radio 620 can be a unit that radiates or emits energy in an electromagnetic spectrum, receives energy in an electromagnetic spectrum, or generates energy that propagates via conductive means. By way of example, a radio 620 can be a unit that transmits a signal to a system or a device or a unit that receives signals from a system or device. Accordingly, it can be appreciated that a radio 620 can be utilized to support wireless communication. In another example, a radio 620 can also be a unit (e.g., a screen on a computer, a circuit board, etc.) that emits noise, which can impact the performance of other radios. Accordingly, it can be further appreciated that a radio 620 can also be a unit that emits noise and interference without supporting wireless communication.

In an aspect, respective radios 620 can support communication with one or more systems. Multiple radios 620 can additionally or alternatively be used for a given system, e.g., to transmit or receive on different frequency bands (e.g., cellular and PCS bands).

In another aspect, a digital processor 630 can be coupled to radios 620a through 620n and can perform various functions, such as processing for data being transmitted or received via the radios 620. The processing for each radio 620 can be dependent on the radio technology supported by that radio and can include encryption, encoding, modulation, etc., for a transmitter; demodulation, decoding, decryption, etc., for a receiver, or the like. In one example, the digital processor 630 can include a coexistence manager 640 that can control operation of the radios 620 in order to improve the performance of the wireless device 600 as generally described herein. The coexistence manager 640 can have access to a database 644, which can store information used to control the operation of the radios 620. As explained further below, the coexistence manager 640 can be adapted for a variety of techniques to decrease interference between the radios. In one example, the coexistence manager 640 requests a measurement gap pattern or DRX cycle that allows an ISM radio to communicate during periods of LTE inactivity. A gap pattern is defined herein as a pattern alternating between periods of activity for a radio (e.g., LTE) and periods of inactivity for the radio.

For simplicity, digital processor 630 is shown in FIG. 6 as a single processor. However, it should be appreciated that the digital processor 630 can include any number of processors, controllers, memories, etc. In one example, a controller/processor 650 can direct the operation of various units within the wireless device 600. Additionally or alternatively, a memory 652 can store program codes and data for the wireless device 600. The digital processor 630, controller/processor 650, and memory 652 can be implemented on one or more integrated circuits (ICs), application specific integrated circuits (ASICs), etc. By way of specific, non-limiting example, the digital processor 630 can be implemented on a Mobile Station Modem (MSM) ASIC.

Figure 7:
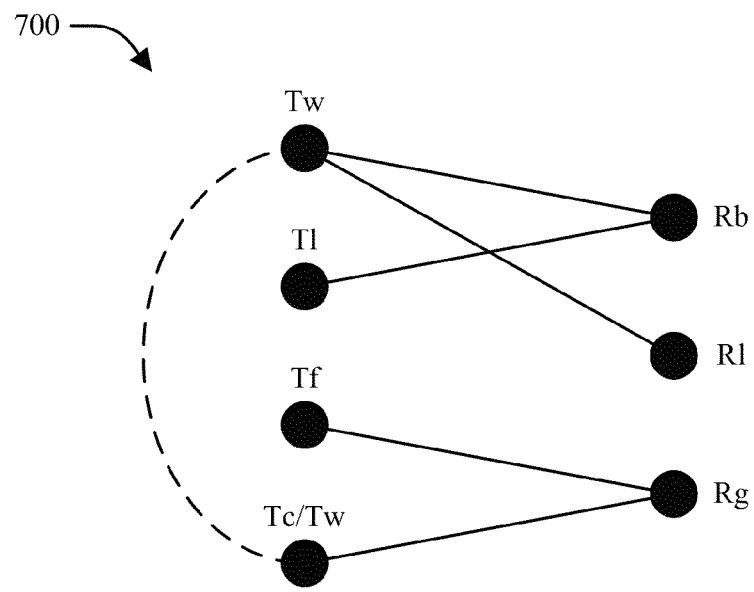
FIG. 7 is graph showing respective potential collisions between seven example radios in a given decision period.

In an aspect, the coexistence manager 640 can manage operation of respective radios 620 utilized by wireless device 600 in order to avoid interference and/or other performance degradation associated with collisions between respective radios 620. Coexistence manager 640 may perform one or more processes, such as those illustrated in FIGS. 11, 13, and 14. By way of further illustration, a graph 700 in FIG. 7 represents respective potential collisions between seven example radios in a given decision period. In the example shown in graph 700, the seven radios include a WLAN transmitter (Tw), an LTE transmitter (Tl), an FM transmitter (Tf), a GSM/WCDMA transmitter (Tc/Tw), an LTE receiver (Rl), a Bluetooth receiver (Rb), and a GPS receiver (Rg). The four transmitters are represented by four nodes on the left side of the graph 700. The four receivers are represented by three nodes on the right side of the graph 700.

A potential collision between a transmitter and a receiver is represented on the graph 700 by a branch connecting the node for the transmitter and the node for the receiver. Accordingly, in the example shown in the graph 700, collisions may exist between (1) the WLAN transmitter (Tw) and the Bluetooth receiver (Rb); (2) the LTE transmitter (Tl) and the Bluetooth receiver (Rb); (3) the WLAN transmitter (Tw) and the LTE receiver (Rl); (4) the FM transmitter (Tf) and the GPS receiver (Rg); (5) a WLAN transmitter (Tw), a GSM/WCDMA transmitter (Tc/Tw), and a GPS receiver (Rg).

Figure 8:
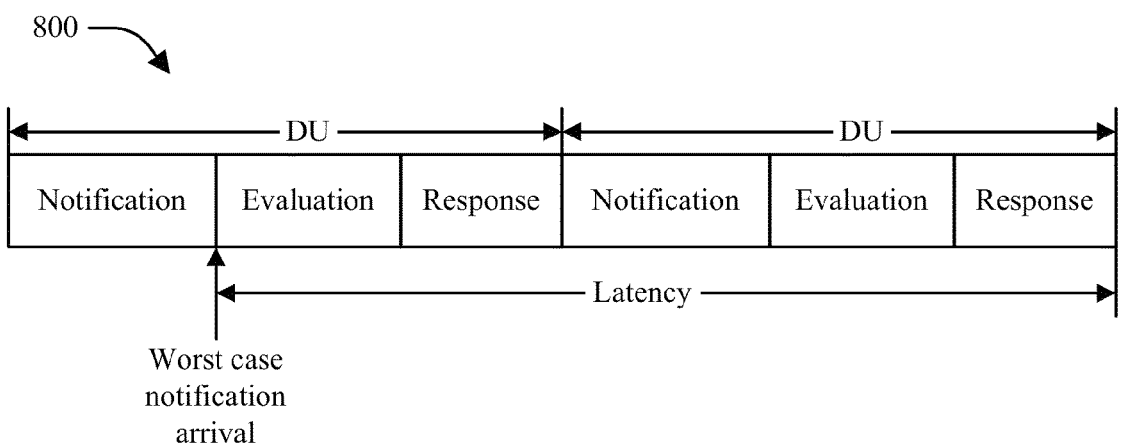
FIG. 8 is a diagram showing operation of an example Coexistence Manager (C×M) over time.

In one aspect, an example coexistence manager 640 can operate in time in a manner such as that shown by diagram 800 in FIG. 8. As diagram 800 illustrates, a timeline for coexistence manager operation can be divided into Decision Units (DUs), which can be any suitable uniform or non-uniform length (e.g., 100 µs) where notifications are processed, and a response phase (e.g., 20 µs) where commands are provided to various radios 620 and/or other operations are performed based on actions taken in the evaluation phase. In one example, the timeline shown in the diagram 800 can have a latency parameter defined by a worst case operation of the timeline, e.g., the timing of a response in the case that a notification is obtained from a given radio immediately following termination of the notification phase in a given DU.

Figure 9:
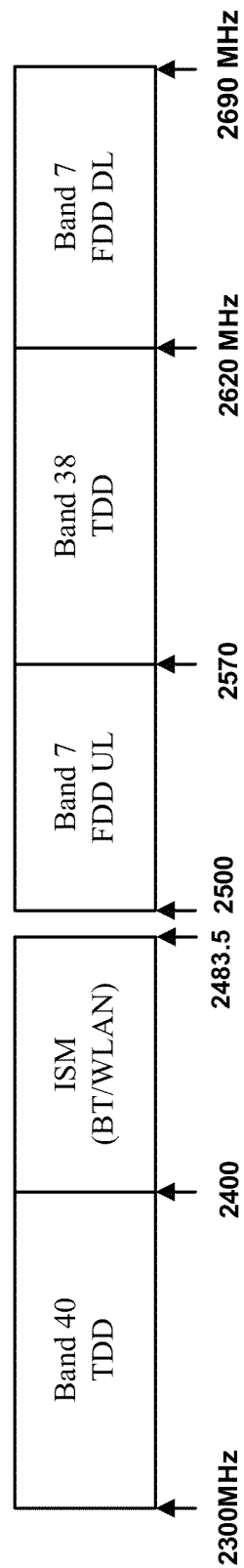
FIG. 9 is a block diagram illustrating adjacent frequency bands.

As shown in FIG. 9, Long Term Evolution (LTE) in band 7 (for frequency division duplex (FDD) uplink), band 40 (for time division duplex (TDD) communication), and band 38 (for TDD downlink) is adjacent to the 2.4 GHz Industrial Scientific and Medical (ISM) band used by Bluetooth (BT) and Wireless Local Area Network (WLAN) technologies. Frequency planning for these bands is such that there is limited or no guard band permitting traditional filtering solutions to avoid interference at adjacent frequencies. For example, a 20 MHz guard band exists between ISM and band 7, but no guard band exists between ISM and band 40.

To be compliant with appropriate standards, communication devices operating over a particular band are to be operable over the entire specified frequency range. For example, in order to be LTE compliant, a mobile station/user equipment should be able to communicate across the entirety of both band 40 (2300-2400 MHz) and band 7 (2500-2570 MHz) as defined by the 3rd Generation Partnership Project (3GPP). Without a sufficient guard band, devices employ filters that overlap into other bands causing band interference. Because band 40 filters are 100 MHz wide to cover the entire band, the rollover from those filters crosses over into the ISM band causing interference. Similarly, ISM devices that use the entirety of the ISM band (e.g., from 2401 through approximately 2480 MHz) will employ filters that rollover into the neighboring band 40 and band 7 and may cause interference.

In-device coexistence problems can exist with respect to a UE between resources such as, for example, LTE and ISM bands (e.g., for Bluetooth/WLAN). In current LTE implementations, any interference issues to LTE are reflected in the downlink measurements (e.g., Reference Signal Received Quality (RSRQ) metrics, etc.) reported by a UE and/or the downlink error rate which the eNB can use to make inter-frequency or inter-RAT handoff decisions to, e.g., move LTE to a channel or RAT with no coexistence issues. However, it can be appreciated that these existing techniques will not work if, for example, the LTE UL is causing interference to Bluetooth/WLAN but the LTE downlink does not see any interference from Bluetooth/WLAN. More particularly, even if the UE autonomously moves itself to another channel on the uplink, the eNB can in some cases handover the UE back to the problematic channel for load balancing purposes. In any case, it can be appreciated that existing techniques do not facilitate use of the bandwidth of the problematic channel in the most efficient way.

Figure 10:
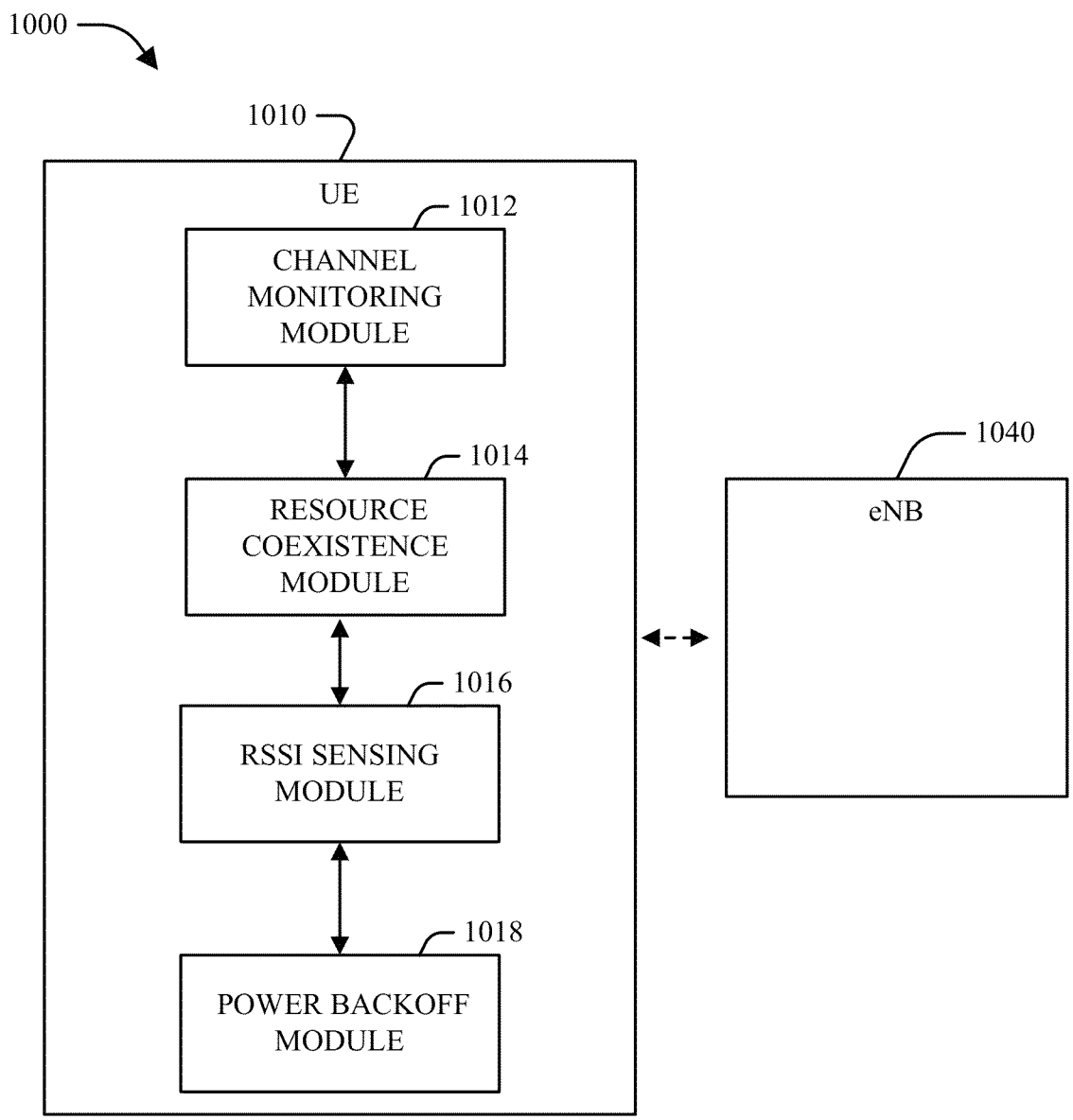
FIG. 10 is a block diagram of a system for providing support within a wireless communication environment for multi-radio coexistence management according to one aspect of the present disclosure.

Turning now to FIG. 10, a block diagram of a system 1000 for providing support within a wireless communication environment for multi-radio coexistence management is illustrated. In an aspect, the system 1000 can include one or more UEs 1010 and/or eNBs 1040, which can engage in uplink and/or downlink communications, and/or any other suitable communication with each other and/or any other entities in the system 1000. In one example, the UE 1010 and/or eNB 1040 can be operable to communicate using a variety resources, including frequency channels and sub-bands, some of which can potentially be colliding with other radio resources (e.g., a broadband radio such as an LTE modem). Thus, the UE 1010 can utilize various techniques for managing coexistence between multiple radios utilized by the UE 1010, as generally described herein.

To mitigate at least the above shortcomings, the UE 1010 can utilize respective features described herein and illustrated by the system 1000 to facilitate support for multi-radio coexistence within the UE 1010. The various modules including the channel monitoring module 1012, resource coexistence analyzer 1014, RSSI sensing module 1016, and power back-off module 1018, as well as other modules may be configured to implement the aspects discussed below. The various modules 1012-1018 may, in some examples, be implemented as part of a coexistence manager such as the coexistence manager 640 of FIG. 6. The various modules 1012-1018 and others may be configured to implement the embodiments discussed herein.

A Bluetooth device, in order to discover other devices, utilizes an operation called inquiry. The purpose of a device inquiry is to collect information about other Bluetooth devices in proximity that might join in a network with the inquiring device at some point in the future. An inquiry operation may last for 10.24 seconds and is a relatively high duty cycle operation. Another high duty cycle Bluetooth operation, paging, establishes a connection between Bluetooth devices. The purpose of a device page is to invite a specific paged device to join a network. Paging typically lasts for a maximum of 5.12 seconds but may automatically terminate when the paged device responds.

Transmission by a Long Term Evolution (LTE) radio may interfere with the ability of a Bluetooth radio to receive incoming signals. Such interference can de-sense a Bluetooth device such that paging/inquiry fails. It may be desired to protect specific Bluetooth operations, such as inquiry and paging, by backing off LTE transmission power to reduce interference to Bluetooth operations. It may not be desirable, however, to back off LTE power more than a certain amount, as such power backoff may negatively impact LTE upload performance. Proposed in this disclosure are aspects to progressively backoff LTE transmission power based on the level of LTE interference and proximity of Bluetooth operations to timeout, after which the Bluetooth operations will fail.

In a 5.12 second long Bluetooth page operation, there are four opportunities (1.28 seconds each), for a page scanning device to hear a page request prior to timeout. The paging request may begin operation without any backoff imposed on LTE. During this early operation period (e.g., 1 second) data may be collected from the Bluetooth signal regarding its interference, approximated with, for example, an average received signal strength indicator (RSSI) value. This average RSSI may be compared with an average RSSI from when LTE was known not to be interfering with Bluetooth operation. The non-interfered RSSI and interfered RSSI may be compared to determine if LTE is causing interference to Bluetooth. A threshold may be established to measure against the compared RSSIs. If they exceed the threshold, a decision to implement power backoff against LTE may occur. Based on the RSSI comparison, power backoff may be applied. For example, the RSSI value may drive a loop on LTE power backoff.

As the paging period continues and approaches page timeout, the threshold may be altered to be even more aggressive in applying LTE backoff to quiet potential interference to Bluetooth. Thus, the decision to apply LTE backoff may be a combined function of the level of interference caused to the Bluetooth device by LTE, as well as the time remaining in the Bluetooth operation before timeout. For example, in the last period of paging (3.84-5.12 seconds), a maximum LTE power backoff may be applied. In another aspect, the level of interference based on RSSI statistics may be more heavily weighted during certain periods of operation (for example a middle period during a paging operation), and remaining time to timeout may be more heavily weighted during other periods of operation (for example a final period before a paging operation). In another configuration, the higher the interference, the higher the backoff. The above scheme may be applied for paging, inquiry, or other Bluetooth operations to be protected.

Progressive backoff may be applied as follows. For each receive attempt, the Bluetooth component may send an RSSI for each received half slot to the coexistence manager. At the coexistence manager, the RSSI is passed to an infinite impulse response (IIR) filter that processes as follows, $$\overline{RSSI} \Theta \alpha \overline{RSSI} + (1-\alpha)RSSI$$

where alpha ($\alpha$) defines the amount of filtering desired and $\overline{RSSI}$ defines an average received signal strength indicator. Note that the above averaging is over frequency and time.

The coexistence manager then calculates whether the LTE transmission is overlapping with that particular half slot based on the level of perceived interference indicated by the RSSI. If there is no LTE overlapping (for example, LTE is not transmitting at the lower 10 MHz of the band), then that corresponding RSSI is identified as $RSSI_{LTEoff}$ and passed to another IIR filter that processes as follows:

$$\overline{RSSI}_{LTEoff} \Theta \alpha \overline{RSSI}_{LTEoff} + (1-\alpha)RSSI_{LTEoff}$$

With the above two filters, the average RSSI ($\overline{RSSI}$) value and also average RSSI value when LTE is off ($\overline{RSSI}_{LTEoff}$) are available. For the early period during paging and inquiry (e.g., the first opportunity (i.e, second)), the coexistence manager may take RSSI measurements as discussed above. When Bluetooth is in receive mode, the RSSI measurements effectively measure interference, as Bluetooth is not transmitting. At the end of the early period, if the LTE duty cycle is high during the early period such that there are not enough samples (less than N_RSSI_LTEoff samples, with an example default value of 30) to compute the $\overline{RSSI}_{LTEoff}$, and if $\overline{RSSI}$>RSSI_thld_connection_setup, where RSSI_thld_connection_setup is a threshold RSSI established according to a connection setup, then the coexistence manager may set an LTE_power headroom report (PHR)_less backoff value to a maximum backoff for a time period (T_blank) (e.g., default 20 ms), such that the coexistence manager may measure $\overline{RSSI}_{LTEoff}$. For this purpose, the allowed LTE maximum transmission (TX) power limit may be LTE_Power_Limit=worst_case_LTE_max PowerLimit where worst_case_LTE_maxPowerLimit is configurable, and may have an example default value of 5 dBm.

At the start of the next period of paging/inquiry (e.g., the $2^{nd}$ second), the coexistence manager may identify LTE as the dominant interferer if both of the following conditions hold:

$\overline{RSSI}$>RSSI_thld_connetion_setup     i.

$\overline{RSSI}_{LTEoff}$<RSSI_LTEoff_thld_connetion_setup     ii.

where RSSI_thld_connection_setup is a threshold RSSI established according to a connection setup and where RSSI_LTEoff_thld_connection_setup is a threshold RSSI established according to a connection setup when LTE is off.

At the start of the $2^{nd}$ second, once LTE is identified as the source of the dominant interference through the above interference assessment, the coexistence manager then sends an LTE_PHR_Backoff message to the LTE radio to begin progressively backing off LTE transmission power.

The power backoff may be based at least in part on the power headroom report (PHR). The following loop may drive the power backoff such that the average RSSI converges to a target value (RSSI_tar_connection_setup). In the loop, $\Delta$ (n) represents a previous power backoff value and $\Delta$(n+1) represents the new power backoff level:

$$\Delta(n+1) = \Delta(n) + \mu_{RSSI\_Connection\_Setup}[\overline{RSSI} - RSSI\_tar\_connection\_setup]$$

where $\mu_{RSSI\_Connection\_Setup}$ is a scaling factor chosen to adjust the loop for desired performance.

The µRSSI_Connection_Setup parameter enables power adjustment in a next interval to be emphasized or deemphasized. For example, as µRSSI_Connection_Setup gets larger, the power backoff applied in a next period may be larger. Conversely, as µRSSI_Connection_Setup gets smaller, the power backoff applied in the next period may be smaller. This feature allows LTE implementations to adjust dynamically to solving coexistence issues.

The above loop will drive the average RSSI value ($\overline{RSSI}$) to converge to RSSI_tar_connection_setup. In the loop, an update occurs every T_PHR_loop_RSSI_Connection_Setup, a time value chosen for the time to update the power headroom report loop (an example default may be set at 20 ms).

As the time gets closer to the page timeout (e.g., 3.84-5.12 seconds), the coexistence manager may become more aggressive on power backoff, and use the maximum power backoff:

LTE_Power_Limit=worst_case_LTE_maxPowerLimit

Paging and inquiry may also occur while Bluetooth is engaged in other active connections (such as extended synchronous connections (eSCO) or active control list (ACL)). The above procedure may also apply to these scenarios. For active connection, there may be another separate interference assessment and power control loop running. The connected mode processes run independent of the connection setup process as active connection supports adaptive frequency hopping (AFH) while connection setup does not. If both connection setup and connected mode are running power control loops, then the minimum of the LTE transmission power limit from those two loops may be sent back to the LTE radio.

For inquiry, the interference assessment and power backoff (if LTE is identified as the dominant interference) is applied for one in N inquiries, where N is a parameter. This is because the inquiry may be periodically controlled by the host. If LTE becomes active from sleep state during the Bluetooth paging/inquiry process, to simplify the design, the maximum LTE power backoff (with PHR modification) is applied when LTE is in a connected state:

LTE_Power_Limit=worst_case_LTE_maxPowerLimit

Figure 11:
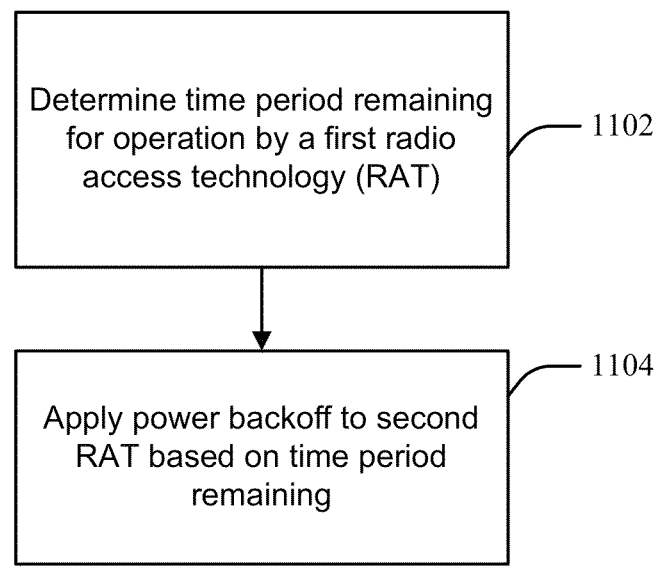
FIG. 11 is a block diagram illustrating progressive power backoff method according to one aspect of the present disclosure.

FIG. 11 illustrates progressive LTE power backoff method according to one aspect of the present disclosure. In block 1102, a coexistence manager determines a time period remaining for an operation by a first radio access technology (RAT). In block 1104, a coexistence manager applies power backoff to a second RAT based on the time period remaining.

Figure 12:
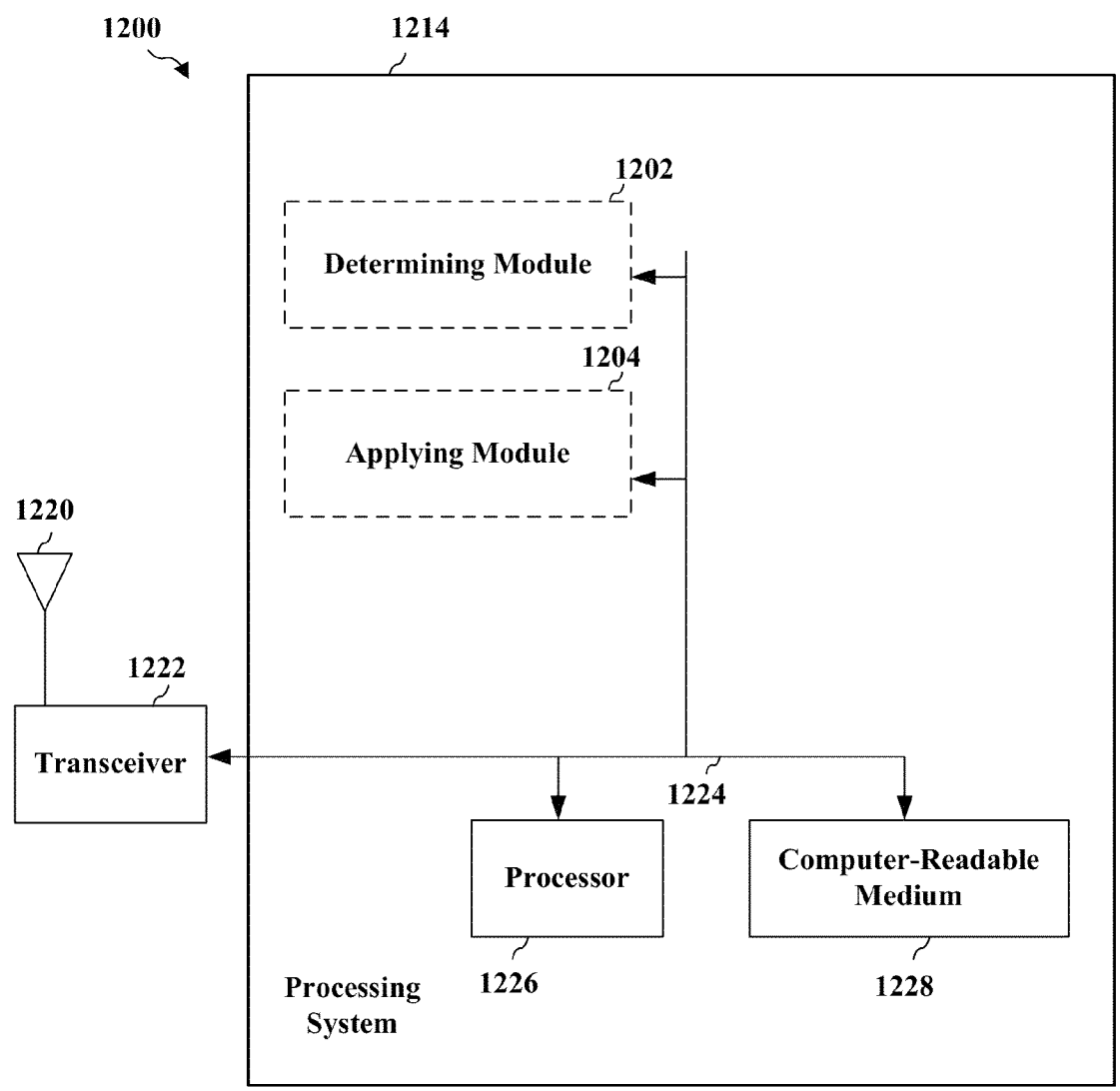
FIG. 12 is a diagram illustrating an example of a hardware implementation for an apparatus employing a processing system.

FIG. 12 is a diagram illustrating an example of a hardware implementation for an apparatus 1200 employing a progressive LTE power backoff system 1214. The progressive LTE power backoff system 1214 may be implemented with a bus architecture, represented generally by a bus 1224. The bus 1224 may include any number of interconnecting buses and bridges depending on the specific application of the progressive LTE power backoff system 1214 and the overall design constraints. The bus 1224 links together various circuits including one or more processors and/or hardware modules, represented by a processor 1226, a determining module 1202 and an applying module 1204, and a computer-readable medium 1228. The bus 1224 may also link various other circuits such as timing sources, peripherals, voltage regulators, and power management circuits, which are well known in the art, and therefore, will not be described any further.

The apparatus includes the progressive LTE power backoff system 1214 coupled to a transceiver 1222. The transceiver 1222 is coupled to one or more antennas 1220. The transceiver 1222 provides a means for communicating with various other apparatus over a transmission medium. The progressive LTE power backoff system 1214 includes the processor 1226 coupled to the computer-readable medium 1228. The processor 1226 is responsible for general processing, including the execution of software stored on the computer-readable medium 1228. The software, when executed by the processor 1226, causes the progressive LTE power backoff system 1214 to perform the various functions described supra for any particular apparatus. The computer-readable medium 1228 may also be used for storing data that is manipulated by the processor 1226 when executing software. The progressive LTE power backoff system 1214 further includes the determining module 1202 for determining a time period remaining for an operation by a first radio access technology. The determining module can also be configured for determining a measurement of potential interference of the first RAT caused by the second RAT. The progressive LTE power backoff system 1214 further includes the applying module 1204 for applying a power backoff to a second RAT based on the time period remaining. The applying module can also can also be configured for applying the power backoff to the second RAT based on the measurement of potential interference. The determining module 1202 and the applying module 1204 may be software modules running in the processor 1226, resident/stored in the computer readable medium 1228, one or more hardware modules coupled to the processor 1226, or some combination thereof. The progressive LTE power backoff system 1214 may be a component of the UE 250 and may include the memory 272 and/or the processor 270.

In one configuration, the apparatus 1200 for wireless communication includes means for means for determining a time period remaining for an operation by a first radio access technology (RAT). The means may be the coexistence manager 640, the determining module 1202, the multi-radio wireless device 600 and/or the progressive LTE power backoff system 1214 of the apparatus 1200 configured to perform the functions recited by the determining means. As described above, the progressive LTE power backoff system system 1214 may include the memory 232/272, and or the processor 230/270. In another aspect, the aforementioned means may be any module or any apparatus configured to perform the functions recited by the aforementioned means.

The apparatus 1200 for wireless communication includes means for means for applying a power backoff to a second RAT based on the time period remaining. The means may be the coexistence manager 640, the applying module 1204, the multi-radio wireless device 600 and/or the progressive LTE power backoff system 1214 of the apparatus 1200 configured to perform the functions recited by the applying means. As described above, the progressive LTE power backoff system 1214 may include the memory 232/272, and or the processor 230/270. In another aspect, the aforementioned means may be any module or any apparatus configured to perform the functions recited by the aforementioned means.

The examples above describe aspects implemented in an LTE system. However, the scope of the disclosure is not so limited. Various aspects may be adapted for use with other communication systems, such as those that employ any of a variety of communication protocols including, but not limited to, CDMA systems, TDMA systems, FDMA systems, and OFDMA systems. Similarly, although the description is with respect to Bluetooth, it should appreciated that the present disclosure is equally applicable to other technologies, e.g., WLAN. Similarly, although RSSI is described as the approximation of interference, other metrics could substitute for or supplement RSSI.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the present disclosure is not intended to be limited to the aspects shown herein but is to be accorded the widest scope consistent with the principles and novel features disclosed herein.

What is claimed is:

1. A method for wireless communications, comprising: determining a time period remaining before completion of an ongoing operation by a first radio access technology (RAT); and applying a power backoff to a transmission of a second RAT based at least in part on the time period remaining of the ongoing operation by the first RAT.

2. The method of claim 1, further comprising: determining a measurement of potential interference of the first RAT caused by the second RAT; and applying the power backoff to the transmission of the second RAT based at least in part the measurement of potential interference.

3. The method of claim 2, in which applying the power backoff to the transmission of the second RAT is further based at least in part on the measurement of potential interference when the measurement of potential interference exceeds a predetermined threshold.

4. The method of claim 2, in which applying the power backoff to the transmission of the second RAT comprises increasing the power backoff when the measurement of potential interference increases.

5. The method of claim 1, in which the applied power backoff increases as the time period remaining decreases.

6. The method of claim 5, in which the applied power backoff is a maximum permitted power backoff toward an end of the time period.

7. The method of claim 1, in which the first RAT comprises Bluetooth and the second RAT comprises Long Term Evolution (LTE).

8. The method of claim 7, in which the operation comprises a paging operation or an inquiry operation.

9. An apparatus for wireless communications, comprising: determining module means for determining a time period remaining before completion of an ongoing operation by a first radio access technology (RAT); and applying module means for applying a power backoff to a transmission of a second RAT based at least in part on the time period remaining of the ongoing operation by the first RAT.

10. The apparatus of claim 9 further comprising: determining module means for determining a measurement of potential interference of the first RAT caused by the second RAT; and applying module means for applying the power backoff to the transmission of the second RAT based at least in part on the measurement of potential interference.

11. An apparatus for wireless communications, comprising:
a memory; and at least one processor coupled to the memory and configured: to determine a time period remaining before completion of an ongoing operation by a first radio access technology (RAT); and to apply a power backoff to a transmission of a second RAT based at least in part on the time period remaining of the ongoing operation by the first RAT.

12. The apparatus of claim 11, in which the at least one processor is further configured: to determine a measurement of potential interference of the first RAT caused by the second RAT; and to apply the power backoff to the transmission of the second RAT based at least in part on the measurement of potential interference.

13. The apparatus of claim 12 in which applying the power backoff to the transmission of the second RAT is further based at least in part on the measurement of potential interference when the measurement of potential interference exceeds a predetermined threshold.

14. The apparatus of claim 12 in which applying the power backoff to the transmission of the second RAT comprises increasing the power backoff when the measurement of potential interference increases.

15. The apparatus of claim 11 in which the applied power backoff increases as the time period remaining decreases.

16. The apparatus of claim 15 in which the applied power backoff is a maximum permitted power backoff toward an end of the time period.

17. The apparatus of claim 11, in which the first RAT comprises Bluetooth and the second RAT comprises Long Term Evolution (LTE).

18. The apparatus of claim 17, in which the operation comprises a paging operation or an inquiry operation.

19. A computer program product for wireless communications in a wireless network, comprising: a non-transitory computer-readable medium having non-transitory program code recorded thereon, the program code comprising: program code to determine a time period remaining before completion of an ongoing operation by a first radio access technology (RAT; and program code to apply a power backoff to a transmission of a second RAT based at least in part on the time period remaining of the ongoing operation by the first RAT.

20. The computer program product of claim 19, in which the program code further comprises: program code to determine a measurement of potential interference of the first RAT caused by the second RAT; and program code to apply the power backoff to the transmission of the second RAT based at least in part on the measurement of potential interference.

* * * * *